2,804,484

FLUOROOLEFINS AND PROCESS FOR THEIR PREPARATION

Paul Tarrant, Gainesville, Fla., and Dale A. Warner, Orange, Tex., assignors to Research Corporation, New York, N. Y., a corporation of New York No Drawing. Application April 16, 1953, Serial No. 349,304

3 Claims. (Cl. 260—653)

This invention relates to new fluoroolefins and to methods for producing them.

Although it is well known that halogen atoms on a carbon atom connected to another carbon atom by a double bond are difficult to remove, we have found that fluorine atoms may be replaced by the use of the Grignard reagent to yield new olefins. For example, one of the fluorine atoms of $CF_2=CFCl$ may be removed in a reaction with phenylmagnesium bromide to give 1-chloro-1,2-difluoro-2-phenylethylene, $C_6H_5CF=CFCl$, in good yields. In general in reactions involving unsymmetrically substituted olefins such as $CF_2=CFCl$, $CF_2=CCl_2$, and others, the fluorine on the carbon atom containing the larger number of fluorine atoms is the one which is replaced.

The reaction also takes place with compounds containing more than two carbon atoms; perfluoroallyl chloride and perfluoroallyl bromide, $CF_2=CFCF_2Cl$ and $CF_2=CFCF_2Br$, respectively, react with aliphatic and aromatic magnesium halides to give interesting products. In some cases, an olefin containing only fluorine as the halogen is chiefly formed, i. e. the other halogen is replaced:

$CH_3MgBr + CF_2=CFCF_2Br \rightarrow CH_3CF_2CF=CF_2 + MgBr_2$

In other cases the other halogen is retained:

$C_6H_5MgBr + CF_2=CFCF_2Cl \rightarrow C_6H_5CF=CFCF_2Cl$

The fluoroolefins of the invention may be polymerized to produce useful resinous compositions, and may be useful as insecticides, plasticizers and as intermediates for the production of useful substances.

The following examples are illustrative of the methods and products of the invention:

Example 1

One hundred and eighty-one parts of $C_6H_5MgBr$ in 350 parts of absolute diethyl ether in a flask equipped with a stirrer, gas inlet tube, and reflux condenser is cooled in an ice bath while 116 parts of $CF_2=CFCl$ is bubbled through the vigorously stirred solution. That part of the olefin which does not react is caught in a trap chilled in Dry Ice and acetone and recycled. After 48 hours of contact the reaction mixture is treated with 10% $H_2SO_4$, the aqueous layer extracted with ether, and the combined ether layers dried. Distillation after removal of ether gives 29 parts of $C_6H_5CF=CFCl$, B. P.$_{50\ mm.}$97–98° C.

Example 2

One hundred and eighty-one parts of $C_6H_5MgBr$ in 350 parts of absolute ether is cooled to 0–5° C. in a flask equipped with a stirrer, reflux condenser, and a gas inlet tube. One hundred and eighteen parts of $CF_2=CCl_2$ is bubbled into the solution with vigorous stirring. After 12 to 18 hours contact the mixture is treated with 10% $H_2SO_4$, separated and dried. Distillation after removal of ether gives 105 parts of $C_6H_5CF=CCl_2$, B. P.$_{13\ mm.}$94.4° C.

Example 3

One hundred and twenty-four parts of

m—$CF_3C_6H_4MgBr$ in 300 parts of absolute ether is cooled in an ice bath in a flask eqiupped with a stirrer, gas inlet tube and ice water-cooled reflux condenser. Sixty-four parts of $CF_2=CCl_2$ is bubbled into the stirred solution. After addition is complete the mixture is stirred in ice for four hours, and for twelve hours at room temperature. The solution is then poured into iced 10% $H_2SO_4$, separated, and the aqueous layer extracted with ether. The combined ethereal extracts are dried and distilled. There is obtained 10 parts of m—$CF_3C_6H_4CF=CCl_2$, B. P.$_{7.7\ mm.}$82–83.5° C.

Example 4

One hundred and two parts of $CH_3OC_6H_4MgBr$ (o- and p-) in 300 parts of absolute ether is cooled to 0–5° C. in a flask fitted with a stirrer, reflux condenser and gas inlet tube. Seventy parts of $CF_2=CCl_2$ is bubbled into the stirred solution which is then allowed to stand overnight. Treatment with 10% $H_2SO_4$, extraction of the water layer with ether, drying the combined ether extracts and fractionation gives 66 parts of $CH_3OC_6H_4CF=CCl_2$, B. P.$_{0.6\ mm.}$93–94° C.

Example 5

Seventy-seven parts of $C_2H_5MgBr$ in 300 parts of absolute ether is cooled in an ice bath and 66 parts of $CF_2=CCl_2$ added. The cooling bath is removed and after reflux has been established the system is closed with a device automatically venting at one atmosphere guage pressure. After stirring for 24 hours the solution is treated with 10% $H_2SO_4$, separated, dried and distilled. The yield is seven parts of $C_2H_5CF=CCl_2$, B. P. 96.5–98° C.

Example 6

Fifty-nine parts of $CH_3MgBr$ in 320 parts of dibutyl ether is cooled to 0° C. in a flask equipped with a stirrer, reflux condenser, and dropping funnel. One hundred and one parts of $CF_2=CFCF_2Br$ is added dropwise. After addition is complete the reaction mixture is stored at 15–20° C. and treated as in the foregoing example. Redistillation of the material boiling below 30° C. gives 35 parts of $CH_3CF_2CF=CF_2$, B. P. 5.0–5.8° C.

Example 7

To 0.5 mole of phenylmagnesium bromide stirred under a nitrogen atmosphere in an ice salt bath is added 0.48 mole (80 g.) of 3-chloropentafluoropropene in four portions. After standing for 18 hours at room temperature the reaction mixture is hydrolyzed with dilute sulfuric acid, dried and distilled. The yield of

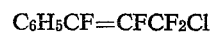
$C_6H_5CF=CFCF_2Cl$ is 35 g. (32.4%). The properties are: B. P. 90–91/22 mm., $n_D^{25}$ 1.4842, $d_4^{25}$ 1.365.

We claim:

1. The method of making fluoroolefines which comprises reacting a perhalogenated olefin in which at least a portion of the halogens are fluorine with a Grignard reagent of the group consisting of alkyl and aryl Grignard reagents whereby one of the halogens is replaced by the organic radical of the Grignard reagent.

2. The method of making fluoroolefines which comprises reacting a perhalogenated ethylene in which at least a portion of the halogens are fluorine with a Grignard reagent of the group consisting of alkyl and aryl Grignard reagents whereby one of the halogens is replaced by the organic radical of the Grignard reagent.

3. The method of making fluoroolefines which comprises reacting a perhalogenated propylene in which at least a portion of the halogens are fluorine with a Grignard reagent of the group consisting of alkyl and aryl Grignard reagents whereby one of the halogens is replaced by the organic radical of the Grignard reagent.

References Cited in the file of this patent

UNITED STATES PATENTS

| | | |
|---|---|---|
| 2,475,423 | Dickey et al. | July 5, 1949 |
| 2,580,504 | Bachman et al. | Jan. 1, 1952 |
| 2,651,627 | Prober | Sept. 8, 1953 |
| 2,668,864 | Hals et al. | Feb. 9, 1954 |
| 2,676,193 | Ruh | Apr. 20, 1954 |
| 2,691,036 | Miller | Oct. 5, 1954 |

OTHER REFERENCES

Simons: Fluorine Chem., p. 502 (1950).